United States Patent [19]
Kanamori et al.

[11] Patent Number: 5,671,963
[45] Date of Patent: Sep. 30, 1997

[54] SPARE TIRE STORAGE ARRANGEMENT

[75] Inventors: Shinji Kanamori; Yoshiaki Hino, both of Saitama-ken, Japan

[73] Assignee: Honda Giken Kobyo Kabushiki Kaisha, Tokyo, Japan

[21] Appl. No.: 738,348

[22] Filed: Oct. 25, 1996

Related U.S. Application Data

[63] Continuation of Ser. No. 506,194, Jul. 24, 1995, abandoned.

[30] Foreign Application Priority Data

Jul. 27, 1994 [JP] Japan ..................... 6-196064

[51] Int. Cl.$^6$ ................................... B62D 43/08
[52] U.S. Cl. ................... 296/37.2; 224/42.26
[58] Field of Search ............ 296/37.2; 224/42.24, 224/42.25, 42.26

[56] References Cited

FOREIGN PATENT DOCUMENTS

| | | |
|---|---|---|
| 61-125884 | 8/1986 | Japan . |
| 61-129679 | 8/1986 | Japan . |
| 4-23586 | 2/1992 | Japan . |
| 4-134788 | 12/1992 | Japan . |

*Primary Examiner*—David M. Mitchell
*Assistant Examiner*—Kia M. Robinson
*Attorney, Agent, or Firm*—Armstrong, Westerman, Hattori, McLeland & Naughton

[57] ABSTRACT

In a spare tire storage arrangement for vertically retaining a spare tire in a rear part of the vehicle body adjacent to a rear wheel house, a recess is provided in an upper part of the wheel house somewhat behind a highest point thereof, and a saddle member is provided behind the wheel house so that protrusion of the spare tire in both the rearward and lateral directions can be minimized. Therefore, this arrangement can be applied to a motor vehicle having rear wheels located extremely close to the rear end of the vehicle, and can maximize the effective volume of the luggage compartment. Also, owing to provision of the inclined supporting surfaces on the side panel, and the replaceable arrangement of the saddle member, it is possible to store spare tires of different sizes without any major modification.

6 Claims, 4 Drawing Sheets

SPARE TIRE STORAGE ARRANGEMENT

This application is a continuation of application Ser. No. 08/506,194 filed Jul. 24, 1995, now abandoned.

TECHNICAL FIELD

The present invention relates to a spare tire storage arrangement for motor vehicles, and in particular to a spare tire storage arrangement for vertically retaining a spare tire in a rear part of the vehicle body adjacent to a rear wheel house.

BACKGROUND OF THE INVENTION

It has been widely practiced to store a spare tire in a trunk or a luggage compartment provided in a rear part of the vehicle in a vertical orientation. Other possible methods of storing a spare tire in a rear part of the vehicle includes providing a compartment under the floor of the trunk for storing a spare tire in a horizontal orientation, and securing a central part of a spare tire onto the rear outer wall of the vehicle body. In particular, in vans and station wagons which allow direct access from the passenger compartment to the luggage compartment, it is preferable to achieve a flat floor surface extending from the passenger compartment to the luggage compartment, and the spare tire is typically placed against an inner side wall of the vehicle body in a vertical orientation.

FIGS. 5 and 6 show a conventional arrangement for storing a spare tire in this fashion. A recess 14 is formed in a part of the floor panel 13 of the luggage compartment 11 adjacent to the right or left inner side panel and behind the rear wheel house 12, and a lower part of the spare tire T is fitted into this recess 14. A central part of the spare tire T is then secured to the inner side panel by using a retaining bracket and a threaded bolt.

However, according to this arrangement, because the recess 14 has to be formed laterally outside of a rear frame member 15 extending longitudinally under the floor panel 13 to the end of avoiding interference with the rear frame member 15, this arrangement cannot be applied to vehicles having a narrower space outside the rear frame member 15 than the width of the spare tire or having a smaller overhang of the floor panel 13 behind the rear wheel house 12 than the outer diameter of the spare tire. It is conceivable to provide a floor recess laterally inside the longitudinal rear frame member 15 for receiving a lower part of the spare tire, it would substantially reduce the effective capacity of the luggage compartment. The rear frame member 15 may be curved so as to avoid interference with the recess 14, but it is not a desirable solution because it will affect the effectiveness of the rear frame member as a structural member.

Also, because such a floor recess needs to be adapted to the width of the spare tire to avoid movement of the spare tire inside the floor recess during use, this arrangement is not suitable for storing more than one kind of spare tire on vehicle bodies of a same design. Furthermore, such a recess tends to cause water and other foreign matters to be accumulated in the bottom part thereof, and it is difficult to keep the recess free from such deposits in particular when a welding seam line passes through the bottom part of the recess as typically is the case.

BRIEF SUMMARY OF THE INVENTION

In view of such problems of the prior art, a primary object of the present invention is to provide an arrangement for storing a spare tire in a rear part of a vehicle body which can be applied to vehicles having limited spaces behind the rear wheel houses and outside the longitudinal rear frame members running under the rear floor panel.

A second object of the present invention is to provide an arrangement for storing a spare tire in a rear part of a vehicle body which would not substantially reduce the luggage compartment.

A third object of the present invention is to provide an arrangement for storing a spare tire in a rear part of a vehicle body which is capable of storing spare tires of different sizes without requiring any major modifications to the arrangement.

A fourth object of the present invention is to provide an arrangement for storing a spare tire in a rear part of a vehicle body which allows easy and ready access to the spare tire.

These and other objects of the present invention can be accomplished by providing an arrangement for storing a spare tire in a vertical orientation in a rear part of a motor vehicle, comprising: a supporting surface at least partly defined by a rear wheel house accommodating a rear wheel and projecting into a luggage compartment provided in a rear part of the vehicle body; and means for holding the spare tire against the supporting surface; the supporting surface defining an inclined surface rising away from a central part of the spare tire, and abutting a peripheral part of the spare tire.

Thus, the spare tire can be stored in an unused space above the wheel house without the possibility of interfering with the longitudinal rear frame member running under the floor panel. The lateral and rearward protrusions can be thus minimized, and the effective volume of the luggage compartment can be maximized. Typically, the supporting surface is defined by a recess provided in the wheel house somewhat behind a highest part of the wheel house, and the spare tire can be favorably fitted into this space even when the rear wheel house is provided extremely near the rear end of the vehicle. Furthermore, the use of the inclined surface as the supporting surface allows spare tires of difference size to be stored without any major modifications to the arrangement. The holding means may consist of any known means for such a purpose, and typically comprises a retaining bracket for holding a central part of the spare tire, and a threaded bolt passed through the retaining bracket and a central bore of the spare tire, and threaded into a part of the side panel.

To allow the spare tire to be supported in a stable fashion while allowing easy access to the spare tire, a saddle member is preferably provided behind the supporting surface to support a lower front portion of the spare tire by the supporting surface, and a lower rear portion the spare tire by the saddle member. To better adapt the arrangement to spare tires of different sizes, the saddle member is preferably adapted to be readily replaced. To ensure a stable support condition in the upper part of the spare tire as well, an upper supporting surface consisting of an inclined surface may be defined in a part of the side panel so as to abut a peripheral part of an upper rear part of the spare tire.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
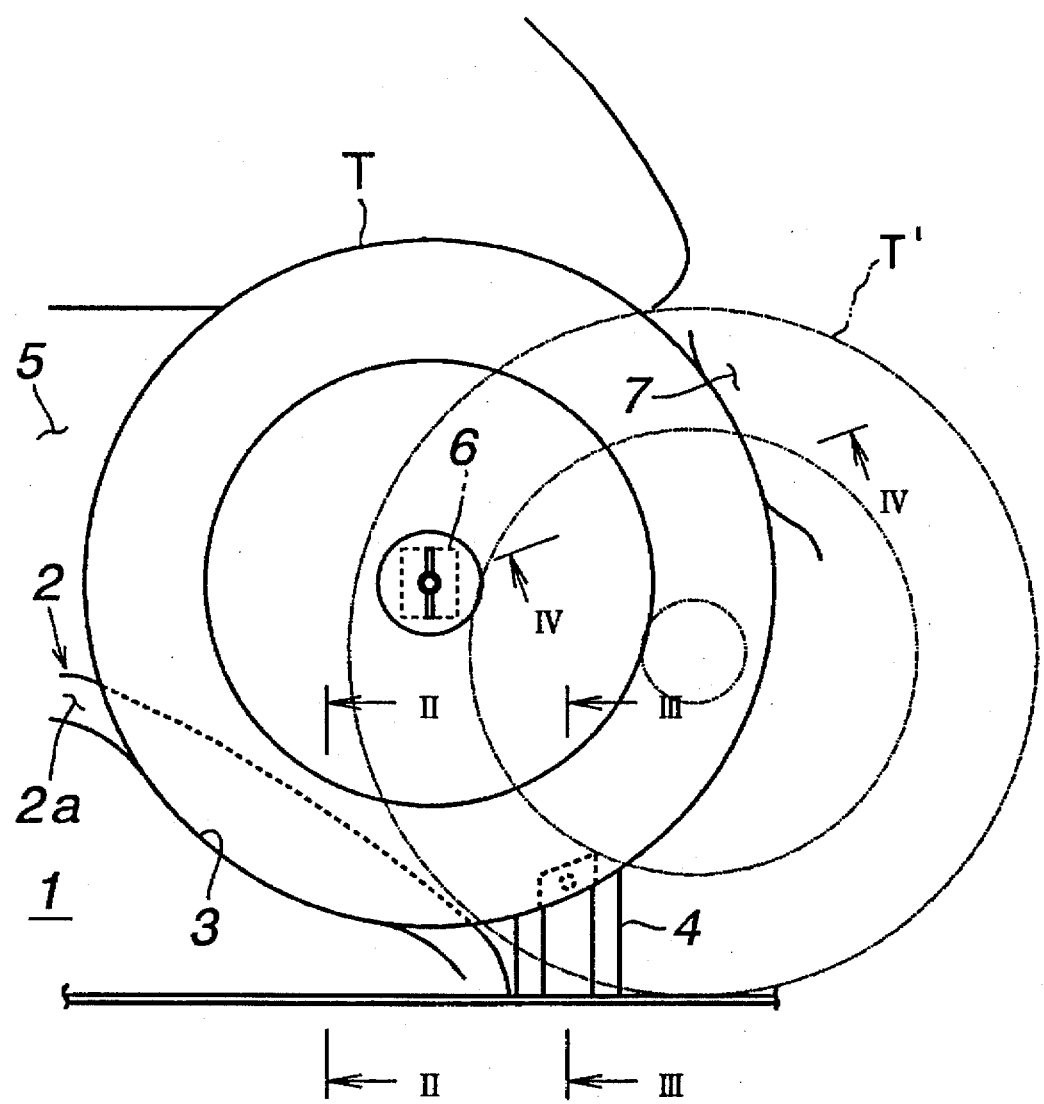
FIG. 1 is a side view of a preferred embodiment of the spare tire storage arrangement applied to a luggage compartment of a station-wagon type motor vehicle.
Figure 2:
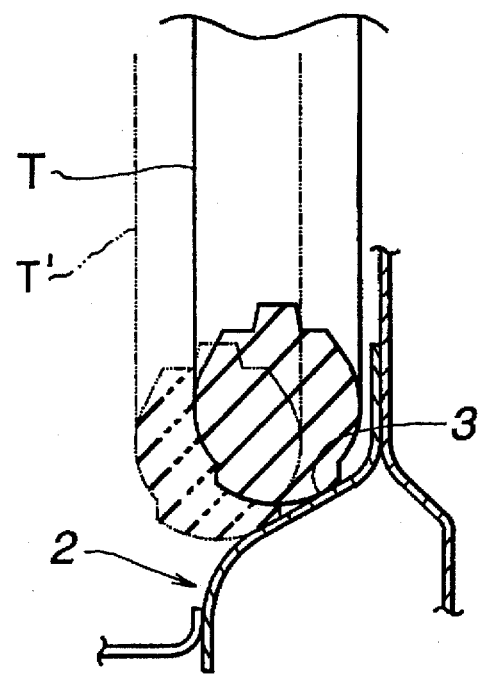
FIG. 2 is a sectional view taken along line II—II of FIG. 1.
Figure 3:
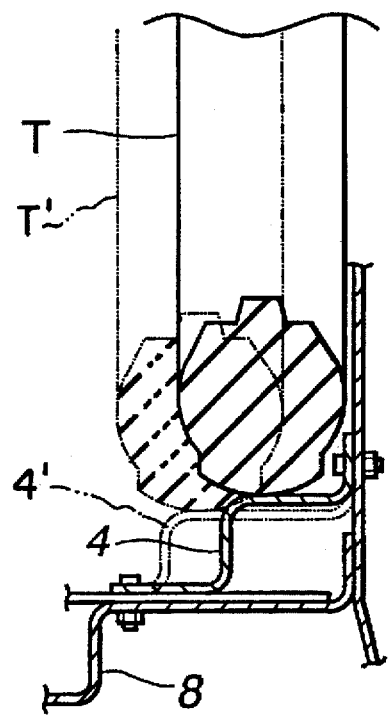
FIG. 3 is a sectional view taken along line III—III of FIG. 1.

Referring to FIGS. 1 and 2, in a luggage compartment 1 of a station-wagon type motor vehicle, a rear wheel housing 2 projects into the luggage compartment 1. A recess 3 is provided in an upper part of the wheel housing 2 slightly behind the highest part of the wheel housing 2 for supporting a lower front part of a spare tire T. Referring also to FIG. 3, a saddle member 4 is provided immediately behind the wheel housing 2 for supporting a lower rear part of the spare tire T. The saddle member 4 in this embodiment consists of a L-shaped plate member attached to associated side and floor panels.

A central part of the spare tire T is attached to a side panel 5 by using a fixed bracket (not shown in the drawing) secured to the side panel, a retaining bracket 6 for holding the spare tire T, and a threaded bolt passed through the retaining plate 6 and threaded into the fixed bracket. The side panel 5 is further provided with a projection 7 for retaining an upper rear part of the spare tire as illustrated in FIGS. 1 and 4.

The lower front part of the spare tire T is supported by the recess 3 which defines an inclined surface 2a, FIG. 1a, inclining downward toward the central part of the spare tire or rising away from the central part of the spare tire as best illustrated in FIG. 2.

The saddle member 4 is secured to the floor panel and the side panel by threaded bolts, and can be removed and replaced when desired. The upper surface of the saddle member 4 is either curved or inclined in such a manner that the round contour of the spare tire T may be snugly supported by the upper surface of the saddle member 4.

Figure 4:
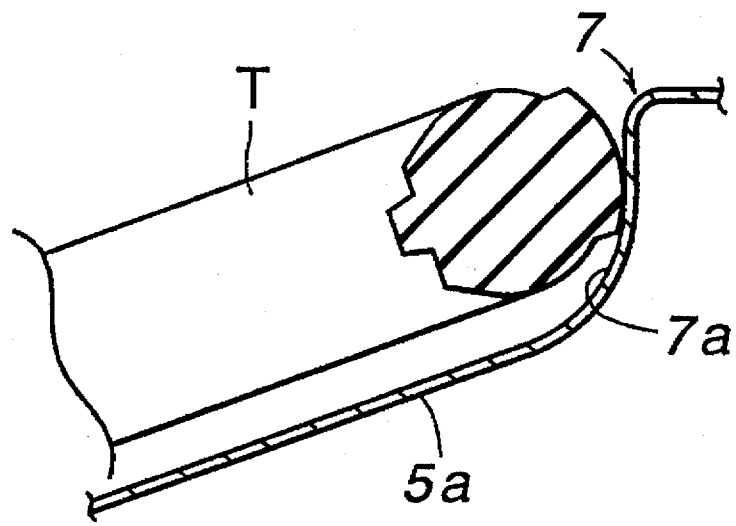
FIG. 4 is a sectional view taken along line IV—IV of FIG. 1.
Figure 6:
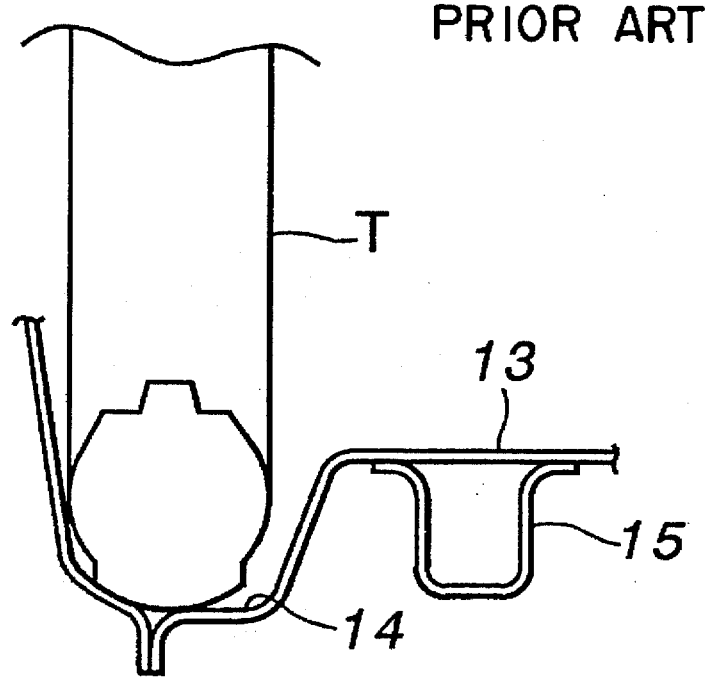
FIG. 6 is a sectional view taken along line VI—VI of FIG. 5.
Figure 5:
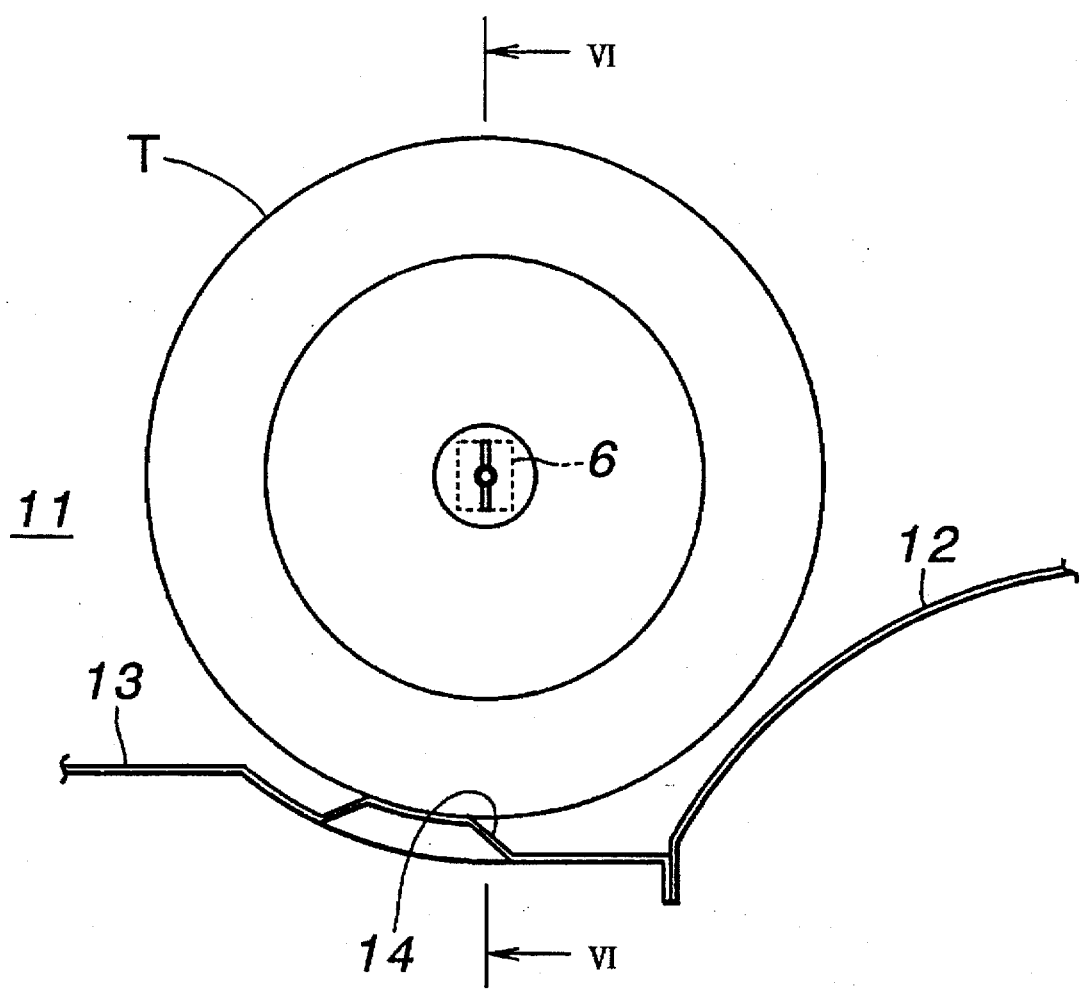
FIG. 5 is a side view of a conventional spare tire storage arrangement for a station-wagon type motor vehicle.

The projection 7 defines a inclined surface 7a, FIG. 4, onto which the upper rear part of the spare tire T abuts. This inclined surface 7a is similar to the inclined surface 2a of the wheel house 2, and inclines downward toward the center of the spare tire T. The inclined surfaces 2a and 7a may be defined by a common conical surface or a dished surface centered around the central part of the spare tire T.

When a spare tire T is desired to be stored by using this arrangement, the lower part of the spare tire T is first supported by the recess 3 of the wheel housing 2 and the saddle member 4, and the threaded bolt is passed through the retaining bracket 6 and the central bore of the wheel of the spare tire and is threaded into the fixed bracket attached to the side panel 5. As shown in FIG. 1, because a part of the spare tire rides on the rear wheel housing 2, the distance by which the spare tire T extends rearward from the wheel housing 2 can be substantially reduced as opposed to the conventional arrangement in which the spare tire is stored in a space defined behind the wheel housing.

Often, tires of different sizes may be desired to be stored by using an identical arrangement either in the production stage or after the motor vehicle has been sold to the user. In such a case, it can be readily accommodated by changing the saddle member 4, 1 shown in solid line, FIG. 3, to a saddle member 4 having a suitable height, such as shown in broken line, FIG. 2. For instance, when a large wheel is desired to be stored, the saddle member 4, shown in solid line FIG. 3, is replaced with a saddle member having a lower height. The position of the fixed bracket is not required to be changed. Thus, by virtue of the fact that the supporting surfaces 2a and 7a FIGS. 1 and 4 on the wheel housing 2 and the side panel 5 are inclined toward the center of the spare tire, and the saddle member is reduced in height, it is possible to mount a large tire central by using a same fastening assembly for the central part. Only the distance between the spare tire and the opposing side panel is required to be somewhat increased.

Conversely, when a smaller spare tire T is desired to be stored, a higher saddle member 4 is used, and the spare tire can be similarly mounted, however, closer to the opposing side panel.

Thus, according to the present invention, owing to the provision of the recess in a part of the wheel housing, protrusion of the spare tire in both the rearward and lateral directions can be minimized so that this arrangement can be applied to a motor vehicle having rear wheels located extremely close to the rear end of the vehicle, and can maximize the effective volume of the luggage compartment. Also, owing to provision of the inclined supporting surfaces on the side panel, and the replaceable arrangement of the saddle member, it is possible to store a spare tire of different size without any major modification.

Although the present invention has been described in terms of a preferred embodiment thereof, it is obvious to a person skilled in the art that various alterations and modifications are possible without departing from the scope of the present invention which is set forth in the appended claims.

What we claim is:

1. An arrangement for storing a spare tire in a vertical orientation in a rear interior part of a motor vehicle body, comprising:

a supporting surface, at least partly defined by a wheel housing accommodating a rear wheel exterior of said vehicle body, and projecting into a luggage compartment at a rear part of said vehicle body; and means for holding said spare tire in said interior part of said vehicle body against said supporting surface;

said supporting surface defining an inclined surface rising away from a central part of said spare tire, and abutting a peripheral part of said spare tire in said interior part of said vehicle body rearwardly of said rear wheel exterior of said vehicle body.

2. An arrangement according to claim 1, wherein said supporting surface is a recess in said wheel housing rearward of a highest part of said wheel housing.

3. An arrangement according to claim 1, wherein said means for holding said spare tire against said supporting surface comprises a retaining bracket for holding a central part of said spare tire, and a threaded bolt passed through said retaining bracket and a central bore of said spare tire, and threaded into a part of a side panel at said rear part of said vehicle body.

4. An arrangement according to claim 1, wherein a saddle member is provided rearward of said supporting surface for supporting a lower portion of said spare tire supported by said supporting surface, and a lower portion of said spare tire by said saddle member.

5. An arrangement according to claim 4, wherein said saddle member is replaceable.

6. An arrangement according to claim 1, further comprising an upper supporting surface having an inclined surface on a side panel of said rear wheel housing for abutting a peripheral part of an upper rear part of said spare tire.

* * * * *